US008657999B2

(12) United States Patent
Lissianski et al.

(10) Patent No.: US 8,657,999 B2
(45) Date of Patent: Feb. 25, 2014

(54) METHODS FOR PREPARING FUEL COMPOSITIONS FROM RENEWABLE SOURCES, AND RELATED SYSTEMS

(75) Inventors: Vitali Victor Lissianski, Laguna Hills, CA (US); R. George Rizeq, Mission Viejo, CA (US); Surinder Prabhjot Singh, Tustin, CA (US)

(73) Assignee: General Electric Company, Niskayuna, NY (US)

( * ) Notice: Subject to any disclaimer, the term of this patent is extended or adjusted under 35 U.S.C. 154(b) by 712 days.

(21) Appl. No.: 12/845,333

(22) Filed: Jul. 28, 2010

(65) Prior Publication Data

US 2012/0029252 A1 Feb. 2, 2012

(51) Int. Cl.
*B01J 19/12* (2006.01)
*C07C 1/20* (2006.01)
*C10B 19/00* (2006.01)

(52) U.S. Cl.
USPC ............. 201/2.5; 201/19; 201/21; 201/25; 585/240; 585/242; 202/96; 202/105; 422/186; 422/186.01

(58) Field of Classification Search
USPC ............. 201/2.5, 20, 21, 25, 19; 202/84, 96, 202/105; 585/240, 241, 242; 219/678, 679; 422/186, 199, 186.01
See application file for complete search history.

(56) References Cited

U.S. PATENT DOCUMENTS

| | | | | |
|---|---|---|---|---|
| 3,749,386 A | * | 7/1973 | Beggs et al. | 266/140 |
| 3,816,101 A | * | 6/1974 | Beggs et al. | 75/496 |
| 4,365,975 A | * | 12/1982 | Williams et al. | 48/197 R |
| 4,647,443 A | * | 3/1987 | Apffel | 423/449.7 |
| 4,839,151 A | * | 6/1989 | Apffel | 423/449.7 |
| 5,277,773 A | * | 1/1994 | Murphy | 204/168 |
| 5,328,577 A | * | 7/1994 | Murphy | 204/168 |
| 5,417,824 A | * | 5/1995 | Greenbaum | 204/157.15 |
| 5,961,786 A | * | 10/1999 | Freel et al. | 202/121 |
| 6,184,427 B1 | * | 2/2001 | Klepfer et al. | 585/241 |
| 6,846,339 B2 | * | 1/2005 | Carnegie et al. | 44/592 |
| 7,387,712 B2 | * | 6/2008 | Purta et al. | 204/157.15 |
| 7,629,497 B2 | * | 12/2009 | Pringle | 585/241 |

(Continued)

FOREIGN PATENT DOCUMENTS

| | | | | |
|---|---|---|---|---|
| CN | 1955118 A | * | 5/2007 | C02F 1/00 |
| CN | 101768452 A | * | 7/2010 | C10B 53/00 |

(Continued)

OTHER PUBLICATIONS

Parisa Monsef-Mirzai, Mythili Ravindran, William R. McWhinnie, Paul Burchill, Rapid microwave pyrolysis of coal, Jan. 1995, Fuel, vol. 74, Issue 1, pp. 20-27.*

(Continued)

*Primary Examiner* — Nina Bhat
*Assistant Examiner* — Jonathan Miller
(74) *Attorney, Agent, or Firm* — Francis T. Coppa

(57) ABSTRACT

A method for producing a fuel composition from a feedstock which may contain biomass and municipal solid waste is described. The method includes the step of pyrolyzing the feedstock in the presence of a transition metal, using microwave energy, so that the level of oxygen in at least one product of the pyrolysis is reduced. An integrated process is also described, in which the transition metal can be regenerated. Moreover, pyrolysis products such as bio-oils can be upgraded to liquid fuel compositions. Related systems for producing fuel compositions are also described.

14 Claims, 2 Drawing Sheets

(56) References Cited

U.S. PATENT DOCUMENTS

| | | | |
|---|---|---|---|
| 7,767,187 B2 * | 8/2010 | Hong | 423/461 |
| 8,323,458 B2 * | 12/2012 | O'Connor et al. | 204/157.6 |
| 8,324,439 B2 * | 12/2012 | Guillon et al. | 585/240 |
| 2004/0074759 A1 * | 4/2004 | Purta et al. | 204/157.15 |
| 2004/0074760 A1 * | 4/2004 | Portnoff et al. | 204/157.15 |
| 2009/0314627 A1 * | 12/2009 | O'Connor et al. | 204/157.15 |

FOREIGN PATENT DOCUMENTS

| | | | | |
|---|---|---|---|---|
| JP | 52023168 A | * | 2/1977 | C10B 53/07 |
| SU | 539945 A | * | 2/1977 | C21B 13/00 |
| WO | WO 2007052778 A1 | * | 5/2007 | B01J 19/22 |

OTHER PUBLICATIONS

Carlos Ludlow-Palafox, Howard A. Chase, Microwave-Induced Pyrolysis of Plastic Wastes, Oct. 2001, Ind. Eng. Chem. Res., vol. 40, No. 22, pp. 4749-4756.*

Zahid Hussain, Khalid Mohammed Khan, Khadim Hussain, Microwave-metal interaction pyrolysis of polystyrene, May 2010, Journal of Analytical and Applied Pyrolysis, vol. 89, pp. 39-43.*

* cited by examiner

METHODS FOR PREPARING FUEL COMPOSITIONS FROM RENEWABLE SOURCES, AND RELATED SYSTEMS

BACKGROUND OF THE INVENTION

This invention generally relates to fuel compositions. Some specific embodiments of the invention are directed to methods for preparing liquid fuels from biomass or municipal solid waste materials.

In view of the projected, long-term shortages in the availability of quality fossil fuels, there has been tremendous interest in the development of renewable sources of fuels. One of the most attractive sources for such fuel is biomass, which can be used to prepare a variety of different types of fuel—some of which are referred to as "biofuel", or "biodiesel". Another potential source is municipal solid waste (MSW), which usually contains primarily household waste, but which can also include commercial waste.

There are two main routes for producing liquid fuels from biomass materials. The indirect route involves biomass gasification. In such a process, the raw material is gasified under partial combustion conditions, to produce a syngas based on carbon monoxide and hydrogen. Air-blown circulating fluidized bed (CFB) gasifiers are often well-suited for small-scale biomass gasification. The syngas can then be converted into a liquid fuel by way of Fischer-Tropsch (FT) synthesis.

While the indirect method is useful in many situations, it often requires very high temperatures, e.g., 800° C.-1,700° C., depending on the type of gasifier. There may also be difficulties in reliably feeding the raw material into the pressurized gasifier. Moreover, for the CFB processes, nitrogen dilution can be problematic. Also, high tar concentrations in the product gas often necessitates subsequent gas clean-up steps, which can increase capital costs.

Pyrolysis is another method for producing the liquid fuels from biomass, and this technique can be thought of as a "direct method". The process itself is known in the art, and involves the thermal decomposition of biomass or other carbonaceous materials. The process is carried out in the absence of oxygen, or in the presence of significantly reduced levels of oxygen, as compared to conventional combustion processes. The temperatures involved are much lower than for gasification, e.g., about 400° C.-600° C. The primary products of pyrolysis are oils, light gases, and char. As further described below, the vapor products of pyrolysis can be condensed to a liquid product, i.e., a "bio-oil", by condensation, for example.

Bio-oils ("pyrolysis oils") are valuable fuel precursors, but they are also quite distinct from hydrocarbon-based petroleum fuels. The high oxygen content of the pyrolysis oils, e.g., up to about 50% by weight, would take such materials outside the conventional definition for a hydrocarbon. These relatively high levels of oxygen limit the use of the compositions, in applications such as transportation fuels (gasoline and diesel fuel). In most instances, the oxygen content would have to be reduced considerably, to allow additional upgrading steps to form the conventional fuels.

In view of these considerations, new processes for preparing fuels, e.g., liquid fuels, from biomass or MSW materials would be welcome in the art. For many end use applications, the processes should be based in part on pyrolysis reactions. Moreover, they should minimize the amount of oxygen content found in one or more of the pyrolysis products. The new processes should also be capable of economic implementation, and should be compatible with other procedures, e.g., fuel upgrading steps of the pyrolysis products.

BRIEF DESCRIPTION OF THE INVENTION

One embodiment of the invention is directed to a method for producing a fuel composition from a feedstock which comprises biomass, municipal solid waste (MSW), or a combination thereof. The method comprises the step of pyrolyzing the feedstock in the presence of a transition metal, using microwave energy, so that the level of oxygen in at least one product of the pyrolysis is reduced.

An integrated process for producing a fuel composition from a feedstock material, comprising at least one of biomass and municipal solid waste, constitutes another embodiment of the invention. The process comprises the steps of:

a) pyrolyzing the feedstock in the presence of a transition metal, using microwave energy, so that the level of oxygen in at least one product of the pyrolysis is reduced; while the transition metal is oxidized;

wherein the pyrolysis product comprises bio-oils, light hydrocarbons, and char;

b) regenerating the transition metal by subjecting the oxidized transition metal to a reduction reaction, wherein the reduction reaction is at least partly energized by the combustion of a portion of the light hydrocarbons; and c) upgrading the bio-oil product to a liquid fuel, by an upgrading process which comprises hydro-treating, hydro-isomerization; and separation of isomerization products.

An additional embodiment of the invention relates to a system for producing a fuel composition from a feedstock material comprising at least one of biomass and municipal solid waste (MSW). The system comprises:

(i) a pyrolysis reactor, adapted to accept a feedstock of biomass or MSW, or combinations thereof; and to convert the feedstock to pyrolysis products;

(ii) a microwave source adapted to supply microwave energy to the pyrolysis reactor;

(iii) a transition metal supply unit in communication with the pyrolysis reactor, to supply a selected amount of transition metal during pyrolysis; and (iv) at least one upgrading unit in communication with the pyrolysis reactor, to convert at least one of the pyrolysis products to a liquid fuel composition.

DETAILED DESCRIPTION OF THE INVENTION

Figure 1:
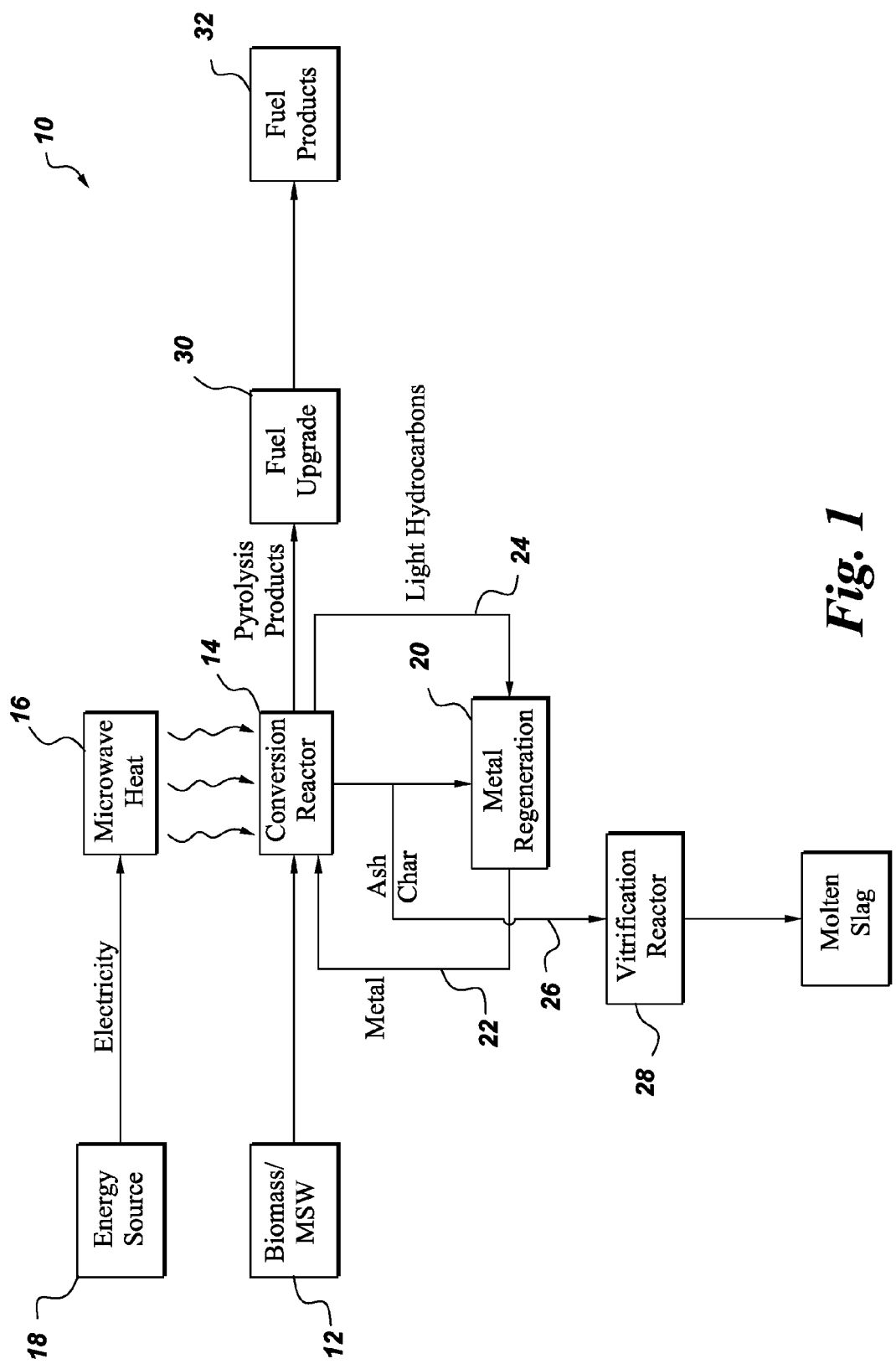
FIG. 1 is a process block flow diagram of the steps in an illustrative process for converting a feedstock to a fuel in a microwave-assisted pyrolysis process.

The compositional ranges disclosed herein are inclusive and combinable (e.g., ranges of "up to about 25 wt %", or, more specifically, "about 5 wt % to about 20 wt %", are inclusive of the endpoints and all intermediate values of the ranges). Weight levels are provided on the basis of the weight of the entire composition, unless otherwise specified; and ratios are also provided on a weight basis. Moreover, the term "combination" is inclusive of blends, mixtures, alloys, reaction products, and the like.

Furthermore, the terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity).

Moreover, in this specification, the suffix "(s)" is usually intended to include both the singular and the plural of the term that it modifies, thereby including one or more of that term (e.g., "the compound" may include one or more compounds, unless otherwise specified). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described inventive features may be combined in any suitable manner in the various embodiments.

As used herein, the term "biomass" may include a variety of renewable energy sources. Usually (though not always), biomass refers to materials derived from plants. In general, biomass can include materials such as wood and tree based materials, forest residues, agricultural residues and energy crops. The wood and tree materials and forest residues may include wood, woodchips, saw dust, bark or other such products from trees, straw, grass, and the like. Agricultural residue and energy crops may further include short rotation herbaceous species, husks such as rice husk, coffee husk, etc., maize, corn stover, oilseeds, residues of oilseed extraction, and the like. The oilseeds may be typical oil bearing seeds like soybean, camolina, canola, rapeseed, corn, cottonseed, sunflower, safflower, olive, peanut, and the like.

The term "municipal solid waste" (MSW), can include household waste, along with commercial wastes, collected by a municipality within a given area. MSW can include inorganic and organic components in the form of cellulosic materials, metals (both ferrous and non-ferrous), plastic, glass, food, and others. MSW can be derived from packaging materials, e.g., mixed cellulosic paperboard packaging materials, corrugated paperboard, plastic wrap, plastic bottles, steel cans, aluminum cans, other plastic or metal packaging materials, glass bottles, and container waste. Such waste can be any combination of plastic, metal, and paper. Material typically available in municipal waste that can be used either as a feedstock for fuel production, or as a valuable recycled product, includes cellulosic fiber or pulp, paperboard, corrugated paperboard, newsprint, glossy magazine stock, and a variety of other cellulosic board or sheet materials, which can include polymers, fillers, dyes, pigments, inks, coatings, and a variety of other materials. Other types of solid waste can also be processed using the apparatus and techniques herein. Those include medical waste, manure, and carcasses. The term "feedstock", as used herein, can include biomass, MSW, or a combination thereof. Usually, the feedstock comprises at least about 10% biomass, by solids-weight; and in some preferred embodiments, at least about 75%.

The present invention calls for pyrolysis of the feedstock. As mentioned above, pyrolysis (sometimes referred to as "destructive distillation") involves the thermal decomposition of biomass. The process is carried out in the absence of oxygen, or in the presence of significantly reduced levels of oxygen. The pyrolysis temperature can vary, but is usually in the range of about 400° C.-600° C. A variety of pyrolysis processes can be used for the present invention.

In some preferred embodiments, the feedstock is subjected to a fast pyrolysis reaction. Fast pyrolysis is known in the art and described, for example, in U.S. Pat. No. 6,844,420 (Freel et al) and U.S. Pat. No. 5,961,786 (Freel et al), and in U.S. Patent Publication 2009/0227766 (Bridgwater et al), all of which are incorporated herein by reference. The process involves the rapid thermal decomposition of organic compounds, in the absence of oxygen, or minimal oxygen, to produce the pyrolysis products, i.e., oils, light gases, and char. In most instances, the feedstock should be relatively dry, with less than about 10% moisture. Moreover, in some embodiments, the particle size of the feedstock is best maintained at less than about 1 mm, and preferably, less than about 0.5 mm. If necessary, conventional techniques can be used to reduce the average particle size to this level.

As further detailed below, the pyrolysis reaction is carried out, using microwave energy. Microwave energy is ideally suited to provide high heating rates. The energy is transferred through a feedstock material electro-magnetically, and not generally as a convective force or a radiative force. Therefore, the rate of heating is not limited by the surface transfer, and the uniformity of heat distribution is greatly improved. Heating times can be reduced to less than about 1% of that required for conventional techniques.

Typically, the energy supplied by a microwave source is provided in two forms: heat energy, and plasma energy. The presence of the microwave plasma appears to be especially suitable in fast pyrolysis techniques, because it lowers the temperature threshold for chemical reactions which take place in the reactor.

The temperature for fast pyrolysis can vary, but is usually below about 600° C., and in some preferred embodiments, below about 550° C. A typical temperature range is about 400° C. to about 500° C. In most embodiments, the relatively hot product stream is then rapidly quenched, as described in U.S. Pat. No. 5,961,786. The quenching step can be carried out by various techniques, e.g., the use of a condensing column. The condensing column may be cooled by a circulating water (or other liquid) system. Cooling can also be carried out by contact with a portion of the pyrolysis oil which is initially formed.

In a typical process available in the art—conventional pyrolysis or fast pyrolysis—the overall oxygen content for the pyrolysis products can be quite high, e.g., up to about 50% by weight. As noted above, the high oxygen content can make it very difficult to upgrade the pyrolysis products (especially the bio-oils) to conventional liquid fuels.

According to primary embodiments of the present invention, pyrolysis of the feedstock is carried out in the presence of at least one transition metal. A number of transition metals are possible. Examples include copper, nickel, cobalt, manganese, iron, and zinc. The choice of a particular transition metal will depend on various factors. Some of these factors are as follows: the composition of the feedstock; the pyrolysis temperature; and the temperature at which metal oxidation and regeneration of the metal (by reduction) would be expected to occur, as described below. Additional factors include a review of the oxidation potential and reduction potential of the metal for a given situation. In some specific embodiments, the transition metal is selected from the group consisting of iron, nickel, and copper. The preferred transition metal is usually iron. Some of the factors listed above are also influenced by the physical form of the transition metal to be used. Usually, the transition metal is employed in particulate form, having an average particle diameter no greater than about 5 mm, and in some instances, no greater than about 1 mm.

The transition metal can be supplied to the pyrolysis reactor in a number of different ways. In some cases, it can be supplied in metallic form; while in other situations, it can be supplied as an oxide, which is reduced (e.g., with a reducing agent) before coming into contact with the pyrolysis products. Various complexes of the metal could be used as well. As described below, the transition metal can be readily incorporated into fluidized bed or entrained-bed tubular reactors which are sometimes used for fast pyrolysis.

The amount of transition metal which is employed will depend on a variety of factors. They include: the size and composition of the feedstock; the oxygen content of the feedstock; the desired level to which oxygen is to be reduced in the pyrolysis products; the type of pyrolysis reactor; and the temperature at which pyrolysis is carried out.

As mentioned above, the presence of the transition metal results in a very desirable decrease in the level of oxygen in at least one product of the pyrolysis, e.g., the pyrolysis oils. In some embodiments, the overall feedstock composition may initially contain oxygen at a level of about 10% to about 50%, based on total solids weight. After the pyrolysis step which includes the presence of the transition metal, the amount of oxygen can be reduced by at least about 50% of the amount before pyrolysis. (As those skilled in the art understand, the amount of oxygen in feedstock materials and pyrolysis products can be measured by various, well-known techniques, e.g., ultimate analysis)

Although the inventors do not wish to be bound by any operational theory, it appears that the transition metal functions according to oxygen scavenging chemistry. Moreover, the use of a transition metal appears to be very advantageous in a pyrolysis process which relies on microwave energy. The particles of the transition metal are very electrically conductive, and favor the formation of microplasma around the particles, in the presence of the microwave energy. It also appears that the transition metal has a catalytic effect on biomass pyrolysis, which also results in decreased oxygen content in the bio-oil product. Thus, the presence of a transition metal like iron may play a dual role in the overall pyrolysis process: (1) catalytically decreasing the oxygen content of the biomass volatiles during the early stage of biomass pyrolysis; and (2) capturing oxygen to form the corresponding metal oxide. (As described below, the metal oxide can then be regenerated to metal form).

FIG. 1 is a process block flow diagram (BFD) of the basic steps in a microwave-based pyrolysis process for preparing fuels, using the feedstock described previously. (Some of the steps are optional, as explained below). The pyrolysis system is generally shown as element 10 in the figure. The feedstock 12 can be contained in a feed hopper (not shown). The material can then be introduced into a conversion reactor (pyrolysis reactor) 14, by known techniques, e.g., pumps, conveyors, screw feeders, or various combinations thereof. In some embodiments, the feedstock material can be ground to smaller particles before being sent to the reactor. Suitable grinders or shredders are commercially available. Moreover, in some embodiments, the feedstock can be directed through a pre-heater (not shown), prior to entering reactor 14.

As alluded to previously, the particular type of conversion reactor can vary, depending on many of the factors noted above. Non-limiting examples of such reactors include tubular reactors, cyclone reactors, rotating cone reactors, ablative reactors, or fluidized bed reactors. Fluidized bed reactors are preferred in some embodiments. Some of these reactors are known in the art, and described in various references, e.g., "Fast Pyrolysis of Biomass in a Fluidized Bed Reactor: In Situ Filtering of the Vapors", E. Hoekstra et al, Ind. Eng. Chem. Res., 2009, 48 (10), pp. 4744-4756, American Chemical Society, 2009; and U.S. Pat. No. 5,961,786 (Freel et al), mentioned previously.

As mentioned above, the feedstock material 12 is heated in the reactor 14 with microwave energy from a microwave source 16. Microwave systems are known in the art, and described in many references. Non-limiting examples include U.S. Pat. No. 7,705,058 (Coutinho et al) and U.S. Pat. No. 7,666,235 (Learey et al), which are incorporated herein by reference. Typically, the microwave energy is generated in at least one magnetron, through a wave guide (not shown). However, many variations of microwave systems are possible.

The microwave power required for pyrolysis will depend on various factors, such as the type of feedstock being treated; and the volume of the feedstock. As a very general illustration, the overall energy requirement for a process producing about 30,000 bpd of liquid fuel (i.e., after upgrading) is in the range of about 15 MW to about 30 MW. In order to satisfy this energy requirement, the microwave energy is usually generated at a power level in the range of about 150 kilowatts per pound (kW/lb) to about 1,00 kilowatts per pound of solid feedstock material. In some instances, the microwave energy is generated at a power level in the range of about 30 kilowatts per pound (kW/lb) to about 500 kilowatts per pound. The frequency of the microwave energy generated will depend in large part on other equipment parameters, and on composition of the feedstock. Usually, the frequency is 800 MHz or 2.45 GHz.

The electricity needed to produce the energy for the microwave system can be supplied by any energy source 18, or by combinations of energy sources. Examples include conventional electrical generators. In some embodiments, the electricity can be provided by a renewable energy source, such as wind, solar, thermal, hydro, or other sources of renewable energy. In this manner, the overall energy system 10 can be self-contained, without requiring energy from outside sources (i.e. without being connected to the "grid").

With continued reference to FIG. 1, a transition metal source, such as a metal regeneration reactor 20, can supply the transition metal to reactor 14, e.g., via conduit/route 22. As mentioned above, the transition metal can be obtained from a number of sources, in a number of different forms. During the pyrolysis process, the transition metal is oxidized, forming one or more corresponding oxides of the metal.

As alluded to previously, the primary products of pyrolysis are pyrolysis oil, light gases (e.g., light hydrocarbon gases), and char. (In some embodiments, the initial pyrolysis products are primarily only char and a product vapor. After removal of the char, the vapor can be condensed to the liquid product, i.e., the bio-oil). The proportions of each of these constituents can vary considerably. In some embodiments, the amount of oil produced, based on total product yield, is about 60% to about 80% by weight. The amount of char produced is about 10% to about 15% by weight; while the amount of gas produced is about 10% to about 25%, by weight. The content of the gaseous component will depend in part on the initial composition of the feedstock. Frequently, the gaseous component comprises hydrogen, carbon monoxide, and light hydrocarbons, e.g., linear, branched, or cyclic hydrocarbons containing less than about 6 carbon atoms in the longest continuous chain. The solid components exiting the pyrolysis reactor usually comprise char, ash, and the transition metal oxide(s), e.g., iron oxide (FeO).

In some preferred embodiments, the transition metal can be regenerated from the oxide, after pyrolysis. The transition metal oxide can first be separated from the other pyrolysis products of reactor 14 by conventional techniques. For example, a cyclone or similar device can be used, since the transition metal is typically heavier than the char or ash products. Alternatively, a magnetic separator may be useful, since the iron oxide is ferromagnetic, while the char component and most of the ash components are not magnetic. Separation of the metal oxide is desirable, since alkali metals in the ash can sinter in the re-generation reactor 20, forming a deactivating coating on the surface of the transition metal particles.

In preferred methods, the transition metal is regenerated by chemical reduction of the metal oxide. Regeneration can take place within regeneration reactor 20. This reactor can be a separate vessel from that used to store and deliver the transition metal to conversion reactor 14 from other sources.

Chemical reduction of the transition metal oxide is an endothermic process. For example, in the case of an iron-based material, the reduction from iron oxide (FeO) to metallic iron may require about 1.2 kJ per gram of the oxide. This energy an be supplied from a number of sources, e.g., any combustion-based source. However, in some preferred embodiments, the energy is supplied by the combustion of some of the hydrocarbon fuel produced in the pyrolysis reaction. Pathway 24 is meant to illustrate, in simple form, the diversion of some of the pyrolysis product to regeneration reactor 20. Moreover, in some embodiments, the combustion of the portion of the pyrolysis products is carried out in a vessel separate from reactor 20, though in communication therewith. This helps to ensure that a low partial pressure of oxygen can be maintained in the regeneration reactor.

Figure 2:
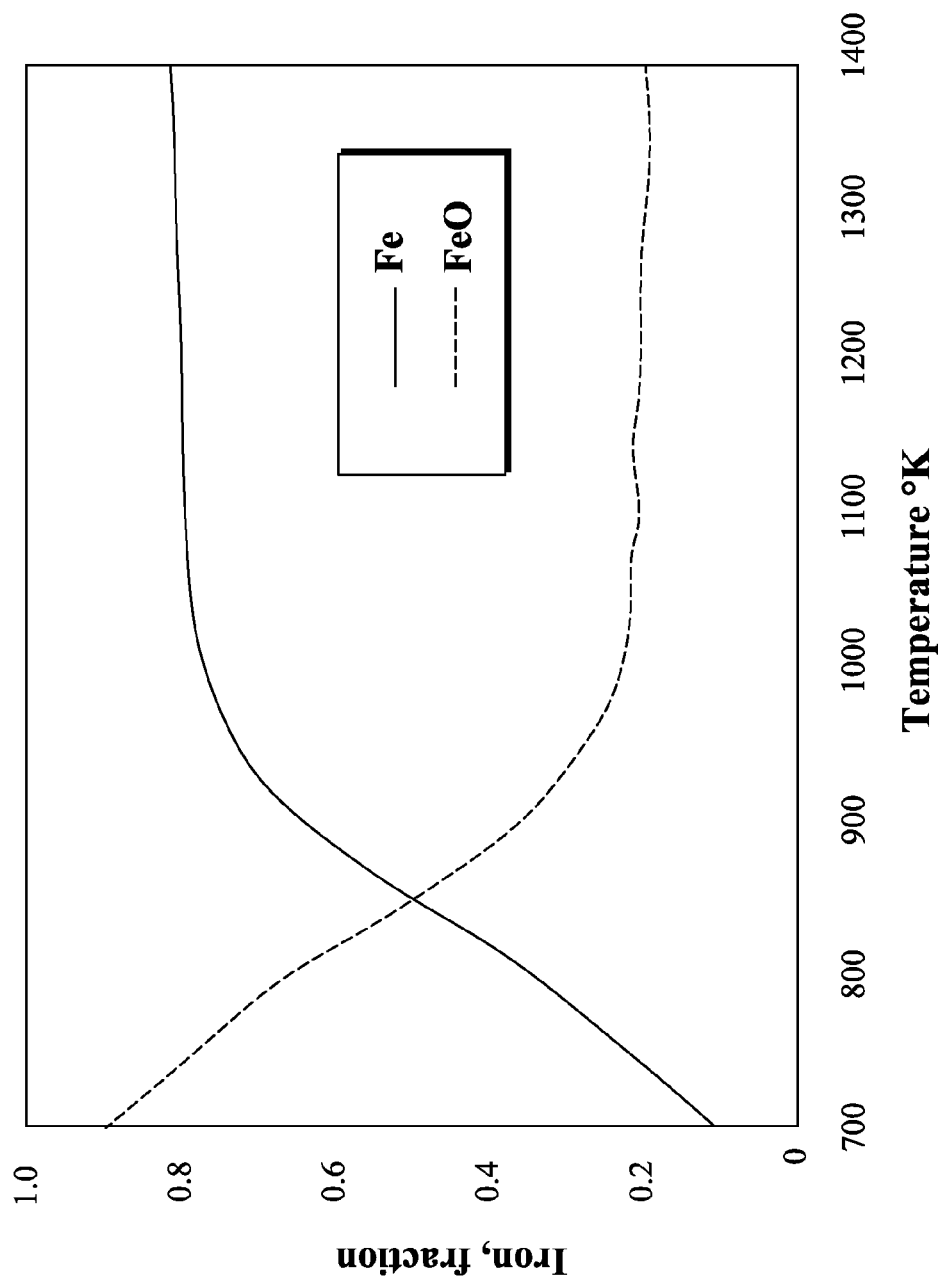
FIG. 2 is a plot of transition metal levels as a function of temperature, under equilibrium conditions, for a biomass pyrolysis reaction.

FIG. 2 is provided to illustrate a general mechanism for the oxidation and regeneration of the transition metal, during the pyrolysis process. The mechanism can be thought of as a "chemical looping" process. It is somewhat analogous to the unmixed combustion processes for oxidizing unoxidized fuels in combustion systems, taught, for example, in U.S. Pat. No. 5,339,754 (R. Lyon), which is incorporated herein by reference.

FIG. 2 plots the fraction of the transition metal (in this case, iron) as a function of temperature, under equilibrium conditions, for a typical biomass pyrolysis reaction. (As described previously, the transition metal reacts with oxygen contained in the feedstock, and the transition metal oxide is formed. This oxide is then reduced back to the metal, in the regeneration reactor). As shown in the figure, the oxidation and reduction of iron take place at different temperatures, which is the key parameter. Moreover, the reactions occur at sub-stoichiometric conditions, i.e., with the amount of oxygen being less-than-stoichiometric. FIG. 2 shows that, under reducing conditions at about 700-800° K., equilibrium conditions favor oxygen transfer to iron. At higher temperatures, the same equilibrium conditions favor oxygen removal from iron, thereby providing a mechanism for iron regeneration.

As also shown in FIG. 1, other byproducts of pyrolysis, such as the ash products and char products, can be removed from the conversion reactor 14, via pathway 26, in a number of ways. As an example, these byproducts can be vitrified by conventional techniques, to form an inert material. Frequently, vitrification is carried out in a furnace of some type (e.g., vitrification reactor 28), followed by rapid cooling in a fluid like water. As described in U.S. patent application Ser. No. 12/478852 (Lissianski et al, filed on Jun. 5, 2009, and incorporated herein by reference), the char can be used in other combustion or gasification systems. It can also be used as fertiliser—especially when the feedstock is made up of significant amounts of biomass.

In some specific embodiments, at least a portion of the pyrolysis products (e.g., the pyrolysis oil and light gases) is subjected to at least one upgrading step 30 (FIG. 1). A typical upgrading procedure is described in detail in U.S. Patent Application Publication 2009/0259082, and involves a hydro-treating step. Hydro-treating can be followed by a hydro-isomerization step, and then a separation step, which separates various components of the isomerization products. The upgrading steps are designed to produce one or more deliverable fuel products 32.

The hydro-treating step differs significantly from the hydro-treating operations which are common in the petroleum industry, i.e., in the refining of crude oil. Petroleum-based feedstock includes asphalt, aromatics, or ring compounds, with carbon chain lengths of about $C_{30}$. In contrast, bio-oils typically include relatively high levels of compounds such as triglycerides, fatty acids and other esters of fatty acids. In the case of bio-oil processing, hydro-treating is primarily employed to effect hydro-deoxygenation. Oxygen does not add to the heating value of the fuel product and hence, it is desirable to keep the concentration of oxygen at relatively low levels, as described previously. In some embodiments, the oxygen concentration is reduced to levels which are less than about 0.01% by weight, after the pyrolysis and hydro-treating steps are carried out.

The hydro-treating reaction also involves the saturation of the double bonds. It removes the double bonds from the components of bio-oil, and this reduces the problems associated with unsaturated compounds that would readily polymerize and cause fuel instability and problems in combustion. The hydrogen reacts with the triglycerides to form hydrogenated triglycerides. The hydrogenated triglycerides further react with hydrogen to form diglycerides, monoglycerides, acids, and waxes. These materials further react with hydrogen, to undergo hydro-deoxygenation to form linear alkanes. As described herein, some of the products include propane, as well as linear $C_{16}$ and $C_{18}$ alkanes.

Other details regarding exemplary hydro-treating operations are provided in U.S. Patent Application Publication 2009/0259082. Transition metal sulfides are generally used as catalysts for hydro-treating, e.g., sulfides of NiMo or CoMo. Typical temperatures maintained during hydro-treating are between about 200° C. and about 450° C. A typical pressure range for the hydro-treating operation is between about 10 bar and about 80 bar. In some embodiments, the pressures of about 40 to about 60 bar, and temperatures of about 280° C. to about 350° C., may be more preferred. Moreover, an illustrative reaction scheme for the hydrogenation of a triglyceride-based vegetable oil, such as soybean oil, is provided in the '082 publication.

The hydro-treating reaction produces water molecules, $CO_2$, and some light hydrocarbons such as propane, in addition to (long chain) linear alkanes, which are the desired products. These additional products can be separated from the linear alkanes, before the step of hydro-isomerization. The water may be used for various purposes, e.g., to form steam, which can be used in a gasification reaction, for example. The light hydrocarbons like propane can be used as a fuel to generate heat energy, e.g., in a steam generating system like a boiler.

As described in U.S. Patent Application Publication 2009/0259082, the hydro-treating reaction is usually followed by a hydro-isomerization reaction (sometimes referred to herein as simply an "isomerization reaction" or "isomerization"). In this step, the linear alkanes present in the mixture are reacted with hydrogen, in the presence of specified catalysts, to produce branched compounds, i.e., branched isomers. The branched isomers of light paraffins have higher octane numbers than the corresponding normal straight alkanes and hence, are often a desirable component of the fuel. For products such as jet fuel, the specifications require that the octane number for a lean mixture of the grade 80 fuel should be about 80 at minimum. (The contents of ASTM Standard D 7566-09 ("Standard Specification for Aviation Turbine Fuel Containing Synthesized Hydrocarbons", © ASTM International, 2009, are incorporated herein by reference). In some embodiments, the fuel composition contains a specified proportion of iso-saturated alkanes and cyclo-saturated alkanes (the total) to normal-saturated alkanes. In this regard, the teachings of U.S. patent application No. 12/710955 (Daniel Derr et al, filed on Feb. 23, 2010) is incorporated herein by reference.

A number of different types of catalysts can be used in the hydro-isomerization step. Examples are provided in U.S. patent application Publication 2009/0259082, and include noble metal catalysts such as platinum. Other examples are zeolite materials, or solid acid catalysts. In some embodiments, the catalyst system comprises a combination of silica-alumina, alumina, and at least one group VIII metal, i.e., iron, cobalt, nickel, ruthenium, rhodium, palladium, osmium, iridium, or platinum. Such a catalyst system is described in patent application 12/344,291 (Deluga et al), filed on Dec. 26, 2008, and incorporated herein by reference. In one more specific example, the catalyst composition comprises:

about 5 weight percent to about 70 weight percent of silica-alumina;

about 30 weight percent to about 90 weight percent alumina; and about 0.01 weight percent to about 2.0 weight percent of a group VIII metal.

Such a catalyst composition can further comprise about 5 weight percent to about 70 weight percent of a zeolite. In some embodiments, the zeolite comprises silicon and aluminum; at a ratio (weight) in the range of about 1.0 to about 300. Non-limiting examples of the zeolites are as follows: zeolite Y, zeolite beta, ferrierite, mordenite, zeolite ZSM-22/23, and zeolite ZSM-5.

In terms of other operating parameters for the hydro-isomerization step, typical temperatures are maintained in the range of about 200° C. and about 450° C. A typical pressure range for the operation is between about 10 bar and about 80 bar. In some embodiments, a pressure range of about 40 to about 60 bar, and a temperature range of about 275° C. to about 350° C., may be more preferred. As also described in Publication 2009/0259082, the isomerization reaction involves rearrangement of the alkyl groups.

As also mentioned previously, a separation step is often undertaken, after hydro-isomerization. This step is very useful in separating the various components which constitute the isomerization products. The step can comprise one or more procedures. As an example, different fractions of the isomerization products can be separated, based on boiling point ranges. Exemplary techniques include flash distillation, fractionation, and the like.

The separation step can also involve a flash operation, wherein the products of the hydro-isomerization step are usually sent at high pressure to a flash vessel, and are then subjected to a low pressure environment. Typically, two streams are formed—the gaseous stream rich in more volatile components, and the liquid stream, which contains a higher percentage of lower volatile components. A cascade of such separations, or a distillation column, may be employed. The separation step may also include a fractionation column, where multiple components (e.g., light hydrocarbons) can be separated in a single column. Moreover, in some embodiments, at least a portion of the light hydrocarbon generated in the hydro-treating operation, or the light hydrocarbon generated in the hydro-isomerization operation, is sent to the separation operation. (Both light hydrocarbon streams can be sent as well). In general, the separation step allows for greater control of the composition of the product fuel.

While the invention has been described with reference to an exemplary embodiment, it will be understood by those skilled in the art that various changes may be made, and equivalents may be substituted for elements thereof, without departing from the scope of the invention. In addition, many modifications may be made to adapt a particular situation or material to the teachings of the invention, without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. A method for producing a fuel composition from a feedstock that includes biomass, municipal solid waste (MSW), or a combination thereof, said method comprising the steps of:
   pyrolyzing the feedstock in the presence of a transition metal using microwave energy, wherein a level of oxygen in at least one pyrolysis product is reduced, and wherein the transition metal is oxidized to form a transition metal oxide; and
   regenerating the transition metal by subjecting the transition metal oxide to a reduction reaction in a regeneration reactor, wherein regeneration of the transition metal is carried out by a reduction reaction which reduces the transition metal oxide, and wherein at least a portion of the energy required for the reduction reaction is supplied by combustion of at least one pyrolysis product.

2. The method of claim 1, wherein the pyrolysis is carried out under plasma conditions, using the microwave energy.

3. The method of claim 1, wherein the transition metal is selected from the group consisting of copper, nickel, cobalt, manganese, iron, and zinc.

4. The method of claim 1, wherein the transition metal is iron.

5. The method of claim 1, wherein the feedstock, prior to pyrolysis, contains oxygen at a level of 10% to about 50%, based on the total solids weight of the feedstock.

6. The method of claim 1, wherein the feedstock contains a pre-determined amount of oxygen before pyrolysis; and after pyrolysis, the amount of oxygen has been reduced by at least about 50% of the amount before pyrolysis.

7. The method of claim 1, wherein pyrolysis of the feedstock produces a composition comprising bio-oils, light hydrocarbons, and char.

8. The method of claim 1, wherein the at least one pyrolysis product which is combusted for the reduction reaction comprises light hydrocarbons.

9. The method of claim 1, wherein at least a portion of the pyrolysis product is subjected to at least one upgrading step.

10. The method of claim 9, wherein the upgrading step comprises hydro-treating.

11. The method of claim 10, wherein the hydro-treating step is followed by a hydro-isomerization step.

12. The method of claim 11, wherein the hydro-isomerization step is followed by at least one separation step, to separate at least some of the isomerization products.

13. An integrated process for producing a fuel composition from a feedstock material that includes at least one of biomass and municipal solid waste, the process comprising the steps of:

a) pyrolyzing the feedstock in the presence of a transition metal using microwave energy, wherein a level of oxygen in at least one pyrolysis product is reduced, and wherein the transition metal is oxidized to form a transition metal oxide;

wherein the at least one pyrolysis product comprises bio-oils, light hydrocarbons, and char;

b) regenerating the transition metal by subjecting the transition metal oxide to a reduction reaction in a regeneration reactor, wherein regeneration of the transition metal is carried out by a reduction reaction which reduces the transition metal oxide, and wherein at least a portion of the energy required for the reduction reaction is supplied by combustion of at least one pyrolysis product; and c) upgrading the bio-oil product to a liquid fuel, by subjecting the bio-oil to an upgrading process comprising hydro-treating, following by hydro-isomerization and separation of isomerization products.

14. A system for producing a fuel composition from a feedstock material that includes at least one of biomass and municipal solid waste (MSW), the system comprising:

(i) a pyrolysis reactor, adapted to accept a feedstock of biomass or municipal solid waste (MSW), or combinations thereof; and to convert the feedstock to pyrolysis products in the presence of a transition metal;

(ii) a microwave source adapted to supply microwave energy to the pyrolysis reactor;

(iii) a regeneration reactor in communication with the pyrolysis reactor, to supply a selected amount of the transition metal during pyrolysis by regenerating the transition metal in a reduction reaction, wherein at least a portion of the energy required for the reduction reaction is supplied by combustion of at least one pyrolysis product; and (iv) at least one upgrading unit in communication with the pyrolysis reactor, to convert at least one of the pyrolysis products to a liquid fuel composition.

* * * * *